(12) United States Patent
Yun

(10) Patent No.: US 8,165,029 B2
(45) Date of Patent: Apr. 24, 2012

(54) METHOD OF PARALLEL DETECTION FOR ETHERNET PROTOCOL

(75) Inventor: Yeou-sun Yun, Suwon (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 3349 days.

(21) Appl. No.: 10/199,097

(22) Filed: Jul. 22, 2002

(65) Prior Publication Data

US 2004/0013126 A1    Jan. 22, 2004

(51) Int. Cl.
  G06F 11/00    (2006.01)
  H04J 1/16    (2006.01)
  H04L 1/00    (2006.01)

(52) U.S. Cl. .......................... 370/242; 370/247; 370/248

(58) Field of Classification Search .................. 709/228, 709/250; 370/278, 282, 463, 465, 461, 462, 370/433, 242, 247, 248, 250, 251, 252, 243, 370/244

See application file for complete search history.

(56) References Cited

U.S. PATENT DOCUMENTS

| | | | | |
|---|---|---|---|---|
| 5,884,041 A * | 3/1999 | Hurwitz | ......................... | 709/228 |
| 5,991,303 A * | 11/1999 | Mills | ............................. | 370/402 |
| 6,141,350 A * | 10/2000 | Mahale et al. | ................ | 370/438 |
| 6,141,352 A * | 10/2000 | Gandy | ........................... | 370/463 |
| 6,198,727 B1 * | 3/2001 | Wakeley et al. | ............... | 370/247 |
| 6,222,852 B1 * | 4/2001 | Gandy | ........................... | 370/463 |
| 6,457,055 B1 * | 9/2002 | Hwong et al. | ................ | 709/227 |
| 6,504,849 B1 * | 1/2003 | Wang et al. | .................... | 370/455 |
| 6,907,008 B1 * | 6/2005 | Moskovich et al. | .......... | 370/241 |
| 6,992,989 B2 * | 1/2006 | Chen et al. | .................... | 370/282 |
| 2002/0039354 A1 * | 4/2002 | Chen et al. | .................... | 370/296 |
| 2003/0158948 A1 * | 8/2003 | Walsh | ........................... | 709/228 |

FOREIGN PATENT DOCUMENTS

JP   A-2000-134216   5/2000
JP   A-2001-285327   10/2001

* cited by examiner

*Primary Examiner* — Chuong T Ho
(74) *Attorney, Agent, or Firm* — Harness, Dickey & Pierce, P.L.C.

(57) ABSTRACT

The invention, in part, provides technology (e.g., a method, an apparatus, software, etc.) according to the Ethernet communication protocol, a method of parallel detection, the method comprising: providing a local link partner device having a local terminal advertisement register including a half duplex capability portion, determining whether auto-negotiation is supported; selecting, if auto-negotiation is not supported by at least one participating terminal, half duplex mode; and updating the value of the half duplex capability portion to indicate half duplex mode.

45 Claims, 14 Drawing Sheets

Fig. 3B (Background Art)

ANAR(Auto-Negotiation Advertisement Register)

| Bit15 | Bit14 | Bit13 | Bit12 | Bit11 | Bit10 | Bit9 | Bit8 | Bit7 | Bit6 | Bit5 | Bit4 | Bit3 | Bit2 | Bit1 | Bit0 |
|---|---|---|---|---|---|---|---|---|---|---|---|---|---|---|---|
| NP | ACK | RF | Reserved | | | | TXFD | TXHD | 10FD | 10HD | Selector(00001) | | | | |

Fig. 3C (Background Art)

ANLPAR(Auto-Negotiation Link Partner Advertisement Register)

| Bit15 | Bit14 | Bit13 | Bit12 | Bit11 | Bit10 | Bit9 | Bit8 | Bit7 | Bit6 | Bit5 | Bit4 | Bit3 | Bit2 | Bit1 | Bit0 |
|---|---|---|---|---|---|---|---|---|---|---|---|---|---|---|---|
| NP | ACK | RF | Reserved | | | T4 | TXFD | TXHD | 10FD | 10HD | Selector(00001) | | | | |

Fig. 3D (Background Art)

ANER(Auto-Negotiation Expansion Register)

| Bit15:5 | Bit4 | Bit3 | Bit2 | Bit1 | Bit0 |
|---|---|---|---|---|---|
| Reserved | PDF | LP_NP_ABLE | NP_ABLE | PAGE_RX | LP_AN_ABLE |

Fig. 6

| Col. | 1 | 2 | 3 | 4 | 5 | 6 |
|---|---|---|---|---|---|---|
| Case | Local's speed* | Local's duplex** | Local's AN | Remote's speed* | Remote's duplex** | Remote's AN |
| 1 | 0 | 0 | 1 | 1 | 0 | 0 |
| 2 | 0 | 0 | 1 | 1 | 1 | 0 |
| 3 | 0 | 1 | 1 | 0 | 0 | 0 |
| 4 | 0 | 1 | 1 | 0 | 1 | 0 |
| 5 | 0 | 1 | 1 | 1 | 0 | 0 |
| 6 | 0 | 1 | 1 | 1 | 1 | 0 |
| 7 | 1 | 0 | 1 | 0 | 0 | 0 |
| 8 | 1 | 0 | 1 | 0 | 1 | 0 |
| 9 | 1 | 1 | 1 | 0 | 0 | 0 |
| 10 | 1 | 1 | 1 | 0 | 1 | 0 |
| 11 | 1 | 1 | 1 | 1 | 0 | 0 |
| 12 | 1 | 1 | 1 | 1 | 1 | 0 |
| 13 | 1 | 0 | 0 | 0 | 0 | 1 |
| 14 | 1 | 1 | 0 | 0 | 0 | 1 |
| 15 | 0 | 0 | 0 | 0 | 1 | 1 |
| 16 | 0 | 1 | 0 | 0 | 1 | 1 |
| 17 | 1 | 0 | 0 | 0 | 1 | 1 |
| 18 | 1 | 1 | 0 | 0 | 1 | 1 |
| 19 | 0 | 0 | 0 | 1 | 0 | 1 |
| 20 | 0 | 1 | 0 | 1 | 0 | 1 |
| 21 | 0 | 0 | 0 | 1 | 1 | 1 |
| 22 | 0 | 1 | 0 | 1 | 1 | 1 |
| 23 | 1 | 0 | 0 | 1 | 1 | 1 |
| 24 | 1 | 1 | 0 | 1 | 1 | 1 |
| 25 | 1 | 0 | 0 | 0 | 0 | 0 |
| 26 | 1 | 1 | 0 | 0 | 0 | 0 |
| 27 | 0 | 0 | 0 | 0 | 1 | 0 |
| 28 | 0 | 1 | 0 | 0 | 1 | 0 |
| 29 | 1 | 0 | 0 | 0 | 1 | 0 |
| 30 | 1 | 1 | 0 | 0 | 1 | 0 |
| 31 | 0 | 0 | 0 | 1 | 0 | 0 |
| 32 | 0 | 1 | 0 | 1 | 0 | 0 |
| 33 | 0 | 0 | 0 | 1 | 1 | 0 |
| 34 | 0 | 1 | 0 | 1 | 1 | 0 |
| 35 | 1 | 0 | 0 | 1 | 1 | 0 |
| 36 | 1 | 1 | 0 | 1 | 1 | 0 |

\* : 0 → 10Mpbs; 1 → 100 Mbps
\*\* : 0 → half; 1 → full

METHOD OF PARALLEL DETECTION FOR ETHERNET PROTOCOL

FIELD OF THE INVENTION

Embodiments of the invention are directed toward an improved method of determining link partner device capability, more particularly to an improved method of parallel detection according to the Ethernet protocol.

BACKGROUND OF THE INVENTION

The Ethernet is a widely-installed local area network (LAN) technology. An Ethernet LAN typically uses coaxial cable or special grades of twisted pair wires. Commonly installed Ethernet systems are called 10BASE-T and provide transmission speeds up to 10 megabytes per second (mbps). Alternatively, fast Ethernet, or 100BASE-T, provides transmission speeds up to 100 megabytes per second. The nomenclature can be explained as follows. The "10" indicates 10 mbps. The "BASE" means a base band network. The "T" indicates a twisted pair of wires. The "100" indicates a speed of 100 mbps.

A function called Auto-Negotiation is a part of the Ethernet standard. Auto-negotiation (AN) makes it possible for devices to exchange information about their abilities over a link segment. This, in turn, allows the devices to perform automatic configuration to achieve the best possible mode of operation over a link. At the least, AN can provide automatic speed matching for multi-speed devices at each end of a link. Multi-speed Ethernet interfaces can then take advantage of the highest speed offered by a multi-speed hub port.

The AN function takes control of the physical communications channel, e.g., twisted pair of wires, when a connection is established to a network device, i.e., when a local link partner attempts to connect to a remote link partner. The AN function detects the various modes that are supported by the remote link partner while advertising which modes it supports, i.e., the modes supported by the local link partner. The AN function will automatically switch to the correct technology, such as 10BASE-T, 100BASE-T, etc., or a corresponding full duplex mode. Once the highest performance common mode is determined, AN passes control of the physical connection to the appropriate technology and becomes transparent until the connection is broken.

The AN function takes place using fast link pulse (FLP) signals. These signals are a modified version of the normal link pulse (NLP) signals used for verifying link integrity, as defined in the original 10BASE-T specifications. The FLP signals are mainly a burst of NLPs (also known as link test pulses (LTPs) in 10BASE-T terminology).

Each FLP includes, among other things, 16 positions corresponding to data pulses. The 16 data positions in an FLP burst form a 16-bit word known as a link code word (LCW). The breakdown of the bit positions in the LCW is shown in the following table.

| D0 | D1 | D2 | D3 | D4 | D5 | D6 | D7 | D8 | D9 | D10 | D11 | D12 | D13 | D14 | D15 |
|----|----|----|----|----|----|----|----|----|----|-----|-----|-----|-----|-----|-----|
| S0 | S1 | S2 | S3 | S4 | A0 | A1 | A2 | A3 | A4 | A5  | A6  | A7  | RF  | Ack | NP  |
| Selector Field | | | | | Technology Ability Field | | | | | | | | | | | where

| Bit | Technology | Relative Priority |
|-----|------------|-------------------|
| A0  | 10Base-T Half Duplex | Lowest |
| A1  | 10Base-T Full Duplex | |
| A2  | 100Base-TX Half Duplex | |
| A3  | 100Base-TX Full Duplex | Highest |

The selector field indicates the appropriate version of the IEEE Standard. The technology ability Field includes 8 bits. These bits are what advertise a device's link capabilities to a remote link partner. The AN protocol contains rules for device configuration based upon bits A0-A3. This is how, e.g., a hub and the device attached to that hub can automatically negotiate and configure themselves to use the highest performance mode of operation.

The AN protocol is designed to work with 100BASE-TX interfaces that do not support FLPs and AN as well as older 10BASE-T interfaces that were built before AN existed. The AN function includes an optional management interface that allows the AN function to be disabled.

The AN function can operate with older, or legacy, LANs due to an aspect of its operation known as the parallel detection function. The parallel detection function accounts for the case where only one end of a physical connection has the AN capability, e.g., the remote link partner does not have AN capability. For example, consider FIG. 1, which depicts a network 100 (according to the Background Art) having a hub 102, a node A 104 and a node B 106. The hub 102 supports both 10BASE-T and 100BASE-TX modes and has AN capability. The node 104 supports both 10BASE-T and 100BASE-TX modes and has AN capability. Accordingly, the node 104 and the hub 102 will use AN to connect at 100BASE-TX mode. In contrast, the node 106 only supports 10BASE-T mode and does not have AN capability. The hub 102 will fall back to the parallel detection function in order to connect successfully with node 106 in the 10BASE-T mode.

In more detail, the hub 102 recognizes that the node 106 (namely, its remote link partner) does not have AN capability. Instead of exchanging configuration information, the hub 102 (via the parallel detection function) examines the signals that it receives from the node 106. If the hub 102 determines that it supports a mode in common with the node 106, then it will connect at the highest speed mode supported commonly by both itself and the node 106.

The AN protocol provides for the entire range of twisted pair Ethernet segments as well as full duplex Ethernet links. Full duplex Ethernet is a variant of Ethernet technology. In contrast to normal Ethernet, devices at each end of a full duplex link can send and receive data simultaneously over the link. This theoretically can double the bandwidth of a normal, i.e., half duplex, Ethernet link.

A basic hardware configuration for the AN function according to the Background Art is schematically illustrated in FIG. 2. A physical layer (PHY) is provided that includes a manage interface (I/F) block 22, an AN block 20, and a physical media attachment (PMA) unit 204. The manage I/F block 22 is provided for interfacing with a medium access control (MAC) layer that is positioned just above the physical layer and includes a management data input/output interface (I/F) 205 and a register block 206. The AN block 20 substantially carries out the auto-negotiation in the physical layer. The AN function exchanges signals with remote link partners via TX and RX signals going to and coming from the PMA 204.

The AN block 20 includes a transmitter 201, an arbiter 202, and a receiver 203. The MAC layer includes a MAC register block 208 and a MAC management data input/output (MDIO) interface (I/F) unit 207. If the power is on, a MAC management block 209, which is typically part of a driver software (S/W) layer, undertakes a predetermined operation to place the PHY layer into a desired mode. That is, after the power-on, the MAC management block 209 of the driver S/W layer sets a value in the PHY register 208 A (within the MAC register block 206). Responding to the signal from the MAC management block 209, the MAC MDIO I/F 207 transfers a signal to a PHY MDIO I/F 205. The PHY MDIO I/F 205 sets values in corresponding registers of a PHY register block 206 into the desired mode.

The PHY register block 206 according to the Background Art is depicted in more detail in FIG. 3A. It includes an ANAR 301, an ANLPAR 302 and an ANER 303. The ANAR (Auto-Negotiation Advertisement Register) 301 indicates information about the capabilities of the local station/link-partner, and is set initially by hardware control or by driver software. The bit pattern of FIG. 3B is as follows.

Bit 8: TXFD—100 BASE—Informing whether TX Full Duplex is supported
Bit 7: TXHD—100 BASE—Informing whether TX Half Duplex is supported
Bit 6: 10FD—10 BASE—Informing whether T Full duplex is supported
Bit 5: 10HD—10 BASE—Informing whether T Half duplex is supported
Bit 4: 0: Selector 00001: Informing that CSMA/CD 802.3 protocol is supported The ANLPAR (Auto-Negotiation Link Partner Advertisement Register) 302 indicates information about the capabilities of the remote station/link-partner and represents the values obtained from the FLP signals received from the AN block 20. Each bit pattern of FIG. 3C is as follows.

Bit 8: TXFD—100 BASE—Indicates whether TX Full duplex is supported
Bit 7: TXHD—100 BASE—Indicates whether TX Half duplex is supported
Bit 6: 10FD—10 BASE—Indicates whether T Full duplex is supported
Bit 5: 10HD—10 BASE—Indicates whether T Half duplex is supported
Bit 4: 0: Selector 00001: Indicates that CSMA/CD 802.3 is supported The ANER (Auto-Negotiation Expansion Register) 303 stores the status information arising from executing the AN function. Each bit pattern of FIG. 3D is as follows.

Bit 4: PDF—Informing of Occurrence of Parallel Detection Fault
Bit 3: LP_NP_ABLE—Informing that the Link Partner is able to conduct the Next Page function
Bit 2: NP_ABLE—Informing that the local station is able to conduct the Next Page function
Bit 1: PAGE_RX—Informing of having received an FLP different from the prior one
Bit 0: LP_AN_ABLE—Informing of that the Link Partner is operable in the AN The modes of operation supported, e.g., 10M/100M, Full/Half, Auto-Negotiation Enable, etc., are indicated by the bit patterns of the ANAR 301 in the PHY register block 206. The Arbiter 202, when enabled to conduct AN, transmits the information of the ANAR 301 in the PHY register block 206 to the transmitter 201 via the signal tx_LCW. And the FLP is transmitted by transmitter 201 to the remote link partner via the PMA 204. In other words, each field of the FLP has the values of the ANAR 301. The receiver 203 accepts information in the form of FLP signals from the link partner via the PMA 204. The arbiter 202 receives information, which is obtained from the received FLP signals, via the signal rx_LCW from the receiver 203, and then stores it into the ANLPAR 302 of the register block 206.

If both partners can conduct the AN, this is indicated to the arbiter 202 via the signal link_status from the PMA 204.

FIG. 4 is a flow chart depicting the typical steps involved in the auto-negotiation function according to the Background Art. Flow begins at step 401, where the arbiter 202 checks whether the AN function is currently enabled, i.e., whether the AN function continues or stops. If yes, flow proceeds to step 402 where the local link partner transmits FLP signals to the remote link partner. From step 402 flow proceeds to decision step 403 where the receiver 203 determines whether the remote link partner has sent FLP signals. If so, then the receiver 203 sets the flag abi_match to the state indicating YES and provides the abi_match flag to the arbiter 202. If not, then the AN function begins the parallel detection function (to be discussed below).

The "YES" branch from step 403 leads to step 404, where the arbiter 202 transmits additional FLP signals, i.e., additional LCWs, to the remote link partner via the transmitter 201 and the PMA unit 204. The remote link partner also transmits additional FLP signals, i.e., additional LCWs to the arbiter 202 via the PMA unit 204 and the receiver 203. After a predetermined number of FLP signals have been exchanged, the arbiter receives a signal rx_LCW from the receiver 203 that represents the link code word of the remote link partner. The arbiter 202 writes this information into the ANLPAR register 302 of the PHY register block 206. Flow proceeds to decision step 405, where the arbiter 202 compares bits B5-B8 of its own ANAR 301 against bits B5-B8 of the ANLPAR 302 (which represent the capabilities of the remote link partner). If one or more of the respective bits B5-B8 have a logic-one value, then the arbiter 202 will select the highest performance common mode that had a match and will establish a link connection (step 406) to the remote link partner. If none of bits B 5 -B 8 have a logic-one match, then the AN function ends in failure.

FIG. 5 expands upon FIG. 4 to include the steps of parallel detection according to the Background Art. Differences in FIG. 5 with respect to FIG. 4 will be discussed. Flow begins in FIG. 5 at step 401, where the arbiter 202 determines whether the AN function is enabled. If so, then flow proceeds to step 402 and onto step 403 as in FIG. 4. If the outcome of decision step 403 is YES, then flow proceeds as in FIG. 4. But if the answer at decision step 403 is NO, flow proceeds to step 502. In other words, if it is determined at step 403 that no FLP signals have been received from the remote link partner, the abi_match parameter is set to indicate a logic NO state and is sent to the arbiter 202 from the receiver 203. Then the arbiter 202 checks the value of the link_status parameter sent from the PMA unit 204 to the arbiter 202, i.e., the arbiter 202 checks whether only simple NLPs have been received. If so, then the arbiter 202 assumes that the remote link partner can only support half duplex mode at step 503.

Flow proceeds to step 504, where the arbiter 202 sets the link_control parameter to indicate 10BASE-T half duplex operation and sends the parameter to the remote link partner via the PMA unit 204. Flow proceeds to decision step 505, where the arbiter 202 receives the reply from the remote link partner via the PMA unit 204 as conveyed by the link_status parameter. The arbiter 202 updates the ANLPAR 302 with the remote link partner's reply information. Then the arbiter 202 again compares bits B5-B8 of its ANAR 301 against bits B5-B8 of the ANLPAR 302. If a match exists, then a link connection is established at step 506. But if no match is found, then the parallel detection function ends in failure (step 507).

Alternatively, in step 401, if the AN function is not enabled, flow proceeds to step 501, where the arbiter 202 causes the transmitter 201 and PMA unit 204 to send normal link pulses (NLPs) to the remote link partner. Flow proceeds from step 501 to step 502, as discussed above.

To restate, the parallel detection function uses normal link pulses (NLPs). But NLPs do not include duplex information.

SUMMARY OF THE INVENTION

The invention, in part, provides technology (e.g., a method, an apparatus, software, etc.) according to the Ethernet communication protocol, for improved parallel detection. Such a method comprises: providing a local link partner device having a local terminal advertisement register including a half duplex capability portion, determining whether auto-negotiation is supported; selecting, if auto-negotiation is not supported by at least one participating terminal, half duplex mode; and updating the value of the half duplex mode portion to indicate half duplex mode capability.

Additional features and advantages of the invention will be more fully apparent from the following detailed description of the preferred embodiments, the appended claims and the accompanying drawings.

BRIEF DESCRIPTION OF THE DRAWINGS

FIGS. 3B, 3C and 3D depict registers in the PHY register block of FIG. 3A in more detail;

FIG. 6 is a table listing permutations of device capabilities which have been recognized, according in part to the invention, as susceptible to parallel detection failure;

DETAILED DESCRIPTION OF THE PREFERRED EMBODIMENTS

The invention, in part, is a recognition that some manufacturers of Ethernet type devices advertise, via the ANAR, only the fastest communication mode supported. Even though lesser modes are supported, some device manufacturer choose not to set the corresponding bits in the ANAR. As such, the invention, also in part, is a recognition that there are many combinations of local link partner and remote link partner operational capabilities that are theoretically able to establish a communication link, but which fail to establish the communication link according to the AN function and parallel detection function of the Background Art because of such modest advertising.

FIG. 6 depicts a table listing the permutations in which such failures can arise. The failures will arise in some of the circumstance in which the local link partners supports the AN function, but the remote link partner does not. The other variables in the table are the local link partner's speed capability (column 1), the local link partner's duplex capability (column 2), the remote link partner's speed capability (column 3) and the remote link partner's duplex capability (column 5).

The invention, also in part, is a recognition that the AN function and the parallel detection function of the Background Art do not provide feedback in a way that promotes recognition of, therefore a solution to, the problem of the failure permutations noted in FIG. 6. In the circumstance in which there is a parallel detection function failure, the arbiter 202 merely sets the parallel detection fault flag (bit 4 of the ANER 303) to indicate failure. But the AN function and the parallel detection function take place in the physical layer, i.e., the media access control layer does not access the physical register block 206 containing the ANER 303. Even if the media access layer could retrieve the error information in the ANER 303, the PDF flag value (bit 4) is not enough to determine the reason for the link connection failure.

The invention, also in part, provides a solution to the problem of reducing the number of failure permutations depicted in FIG. 6.

The invention, also in part, provides a solution to the problem of not communicating failure information from the physical layer to the media access control layer.

Figure 1:
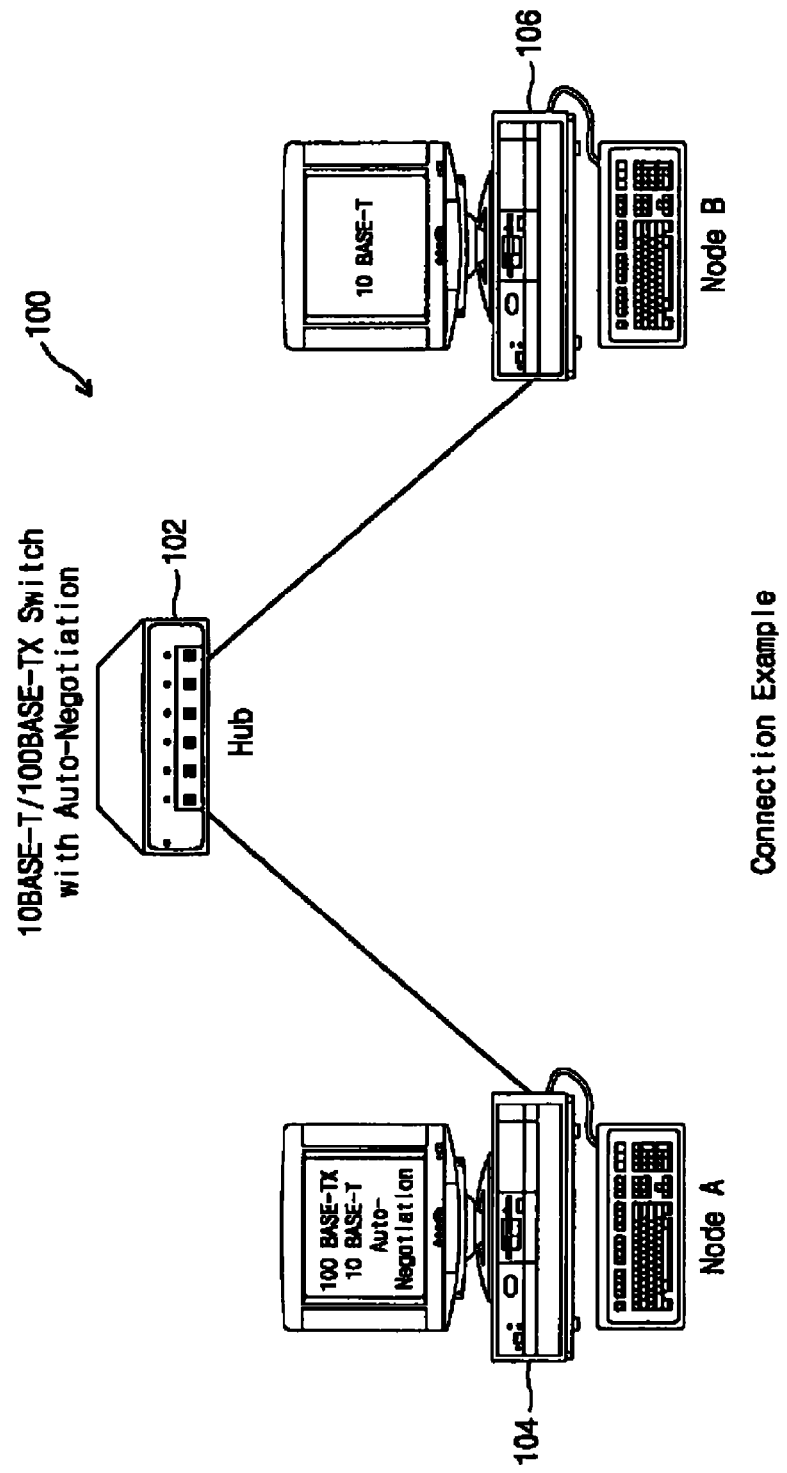
FIG. 1 depicts a simplistic network according to the Background Art.
Figure 2:
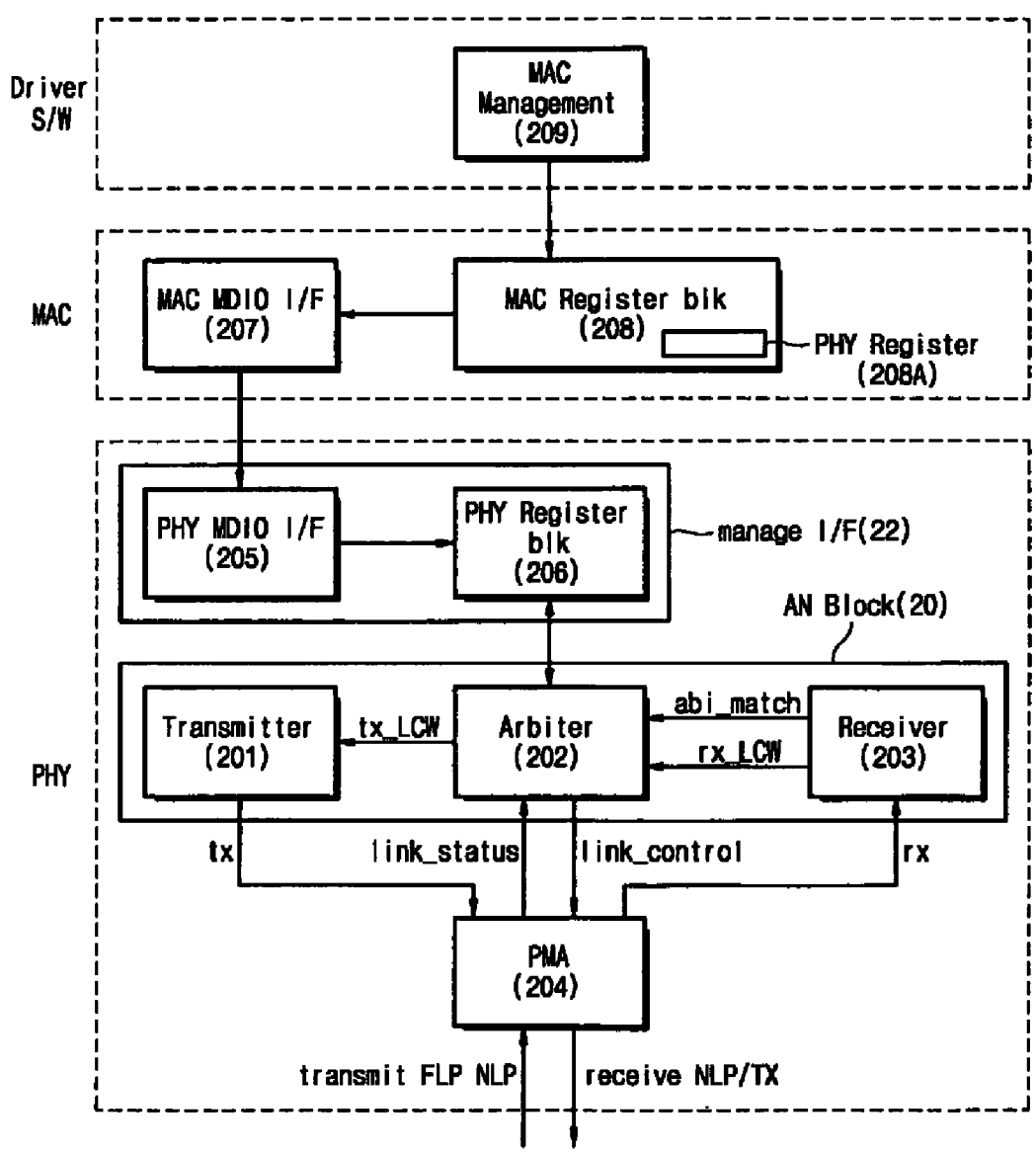
FIG. 2 depicts a basic hardware configuration for the AN function according to the Background Art.
Figure 3A:
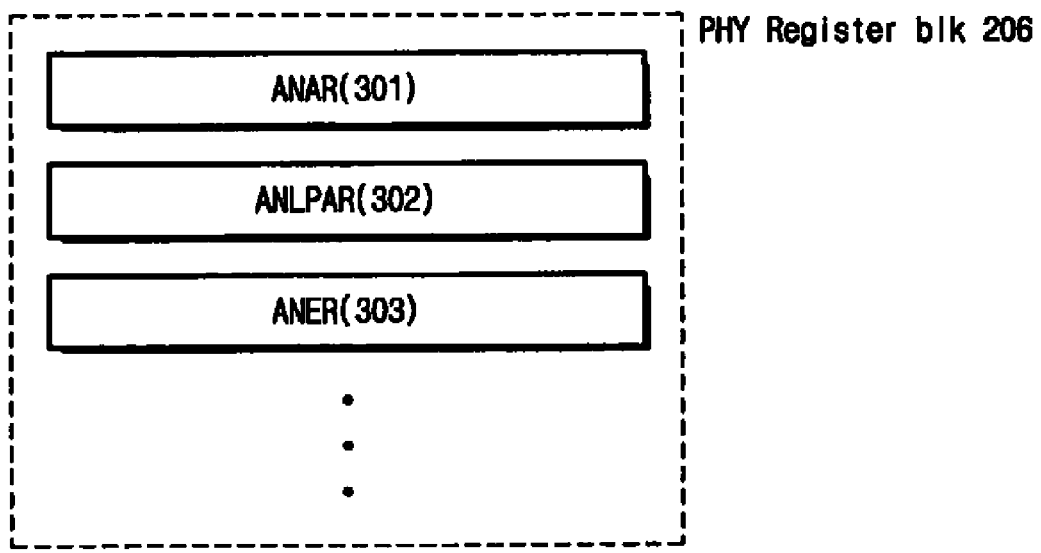
FIG. 3A depicts a PHY register block according to the Background Art.
Figure 4:
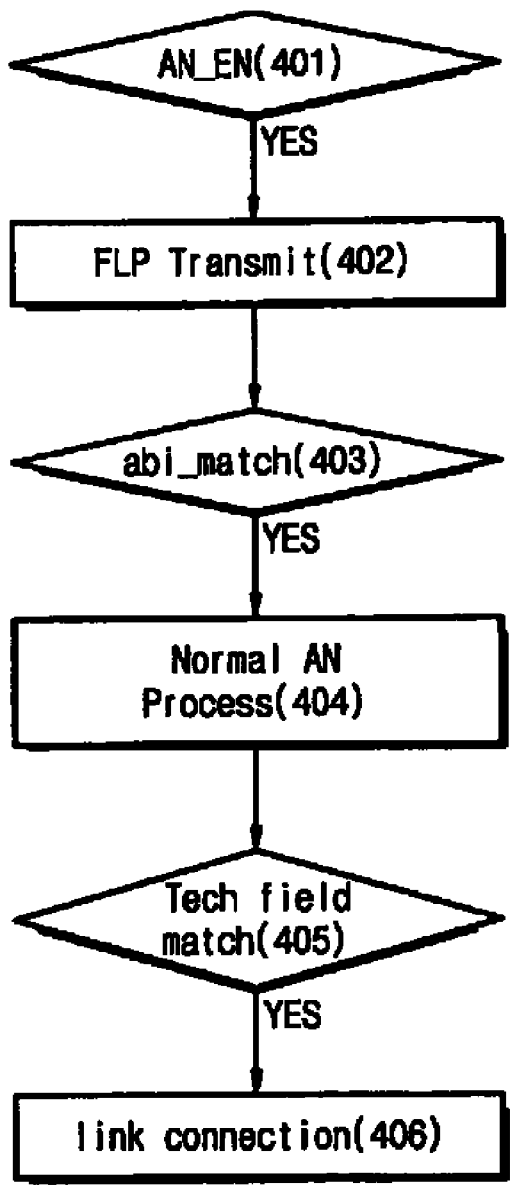
FIG. 4 is a flow chart showing a basic procedure of the AN function according to the Background Art.

The layer architecture of various embodiments of the invention will now be described. Differences with respect to Background Art FIG. 2 will be discussed.

Figure 7A:
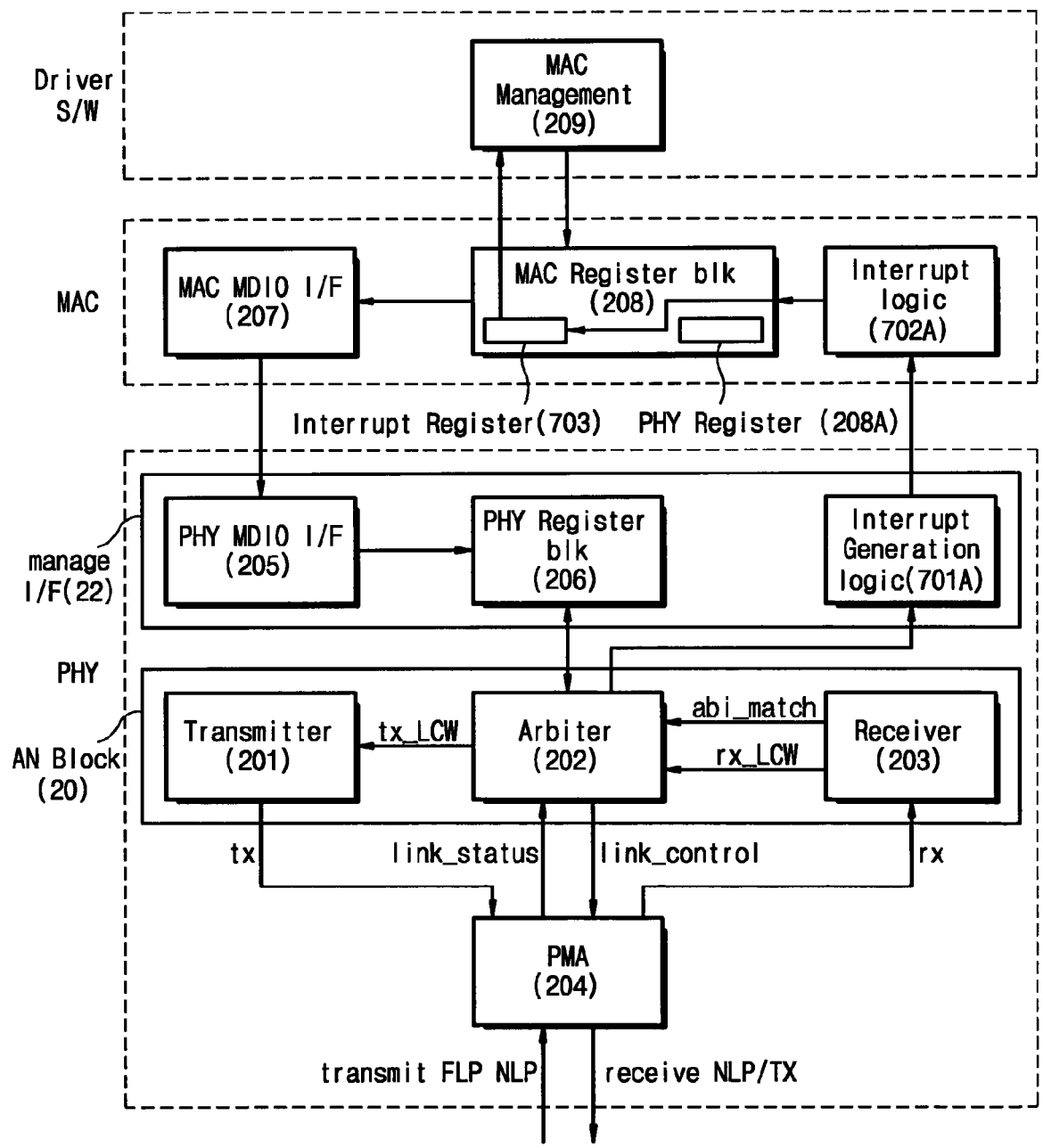
FIG. 7A is a diagram of layer architecture according to an embodiment of the present invention.

FIG. 7A depicts a first embodiment of a layer architecture according to the invention. In FIG. 7A, an interrupt generation logic unit 701A is provided in the manage I/F block 22 of the physical layer PHY. Also, an interrupt logic unit 702A is provided in the media access control layer. The interrupt generation logic unit 701A receives signals directly from the arbiter 202. The interrupt logic unit 702A receives signals directly from the interrupt generation logic unit 701A. And the MAC register block 208 receives signals directly from the interrupt logic unit 702A. An additional register, namely the interrupt register 703, is provided in the MAC register block 208 to receive the signal from the interrupt logic unit 702A. The MAC management unit 209 can read the state of the interrupt register 703.

Figure 7B:
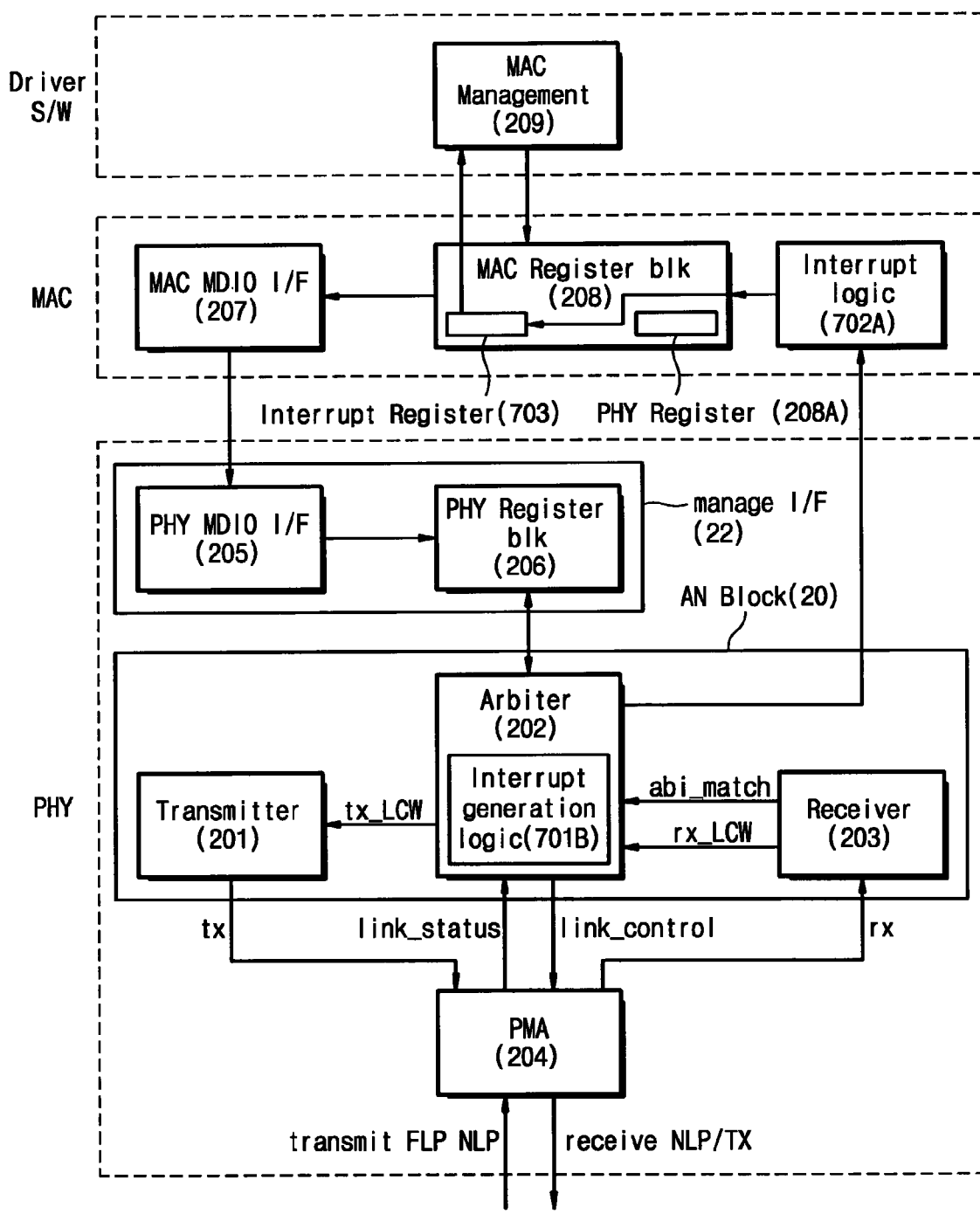
FIG. 7B is a diagram of layer architecture according to an embodiment of the present invention.

FIG. 7B depicts another embodiment of the layer architecture according to the invention. Like FIG. 7A, FIG. 7B depicts interrupt logic unit 702B and interrupt register 703 that are not present in the Background Art FIG. 2. In contrast to FIG. 7A, an interrupt generation logic unit 701B is provided integrally within the arbiter 202. The interrupt general logic unit 701B, as part of the arbiter 202, can communicate signals directly to the interrupt logic 702B.

Figure 7C:
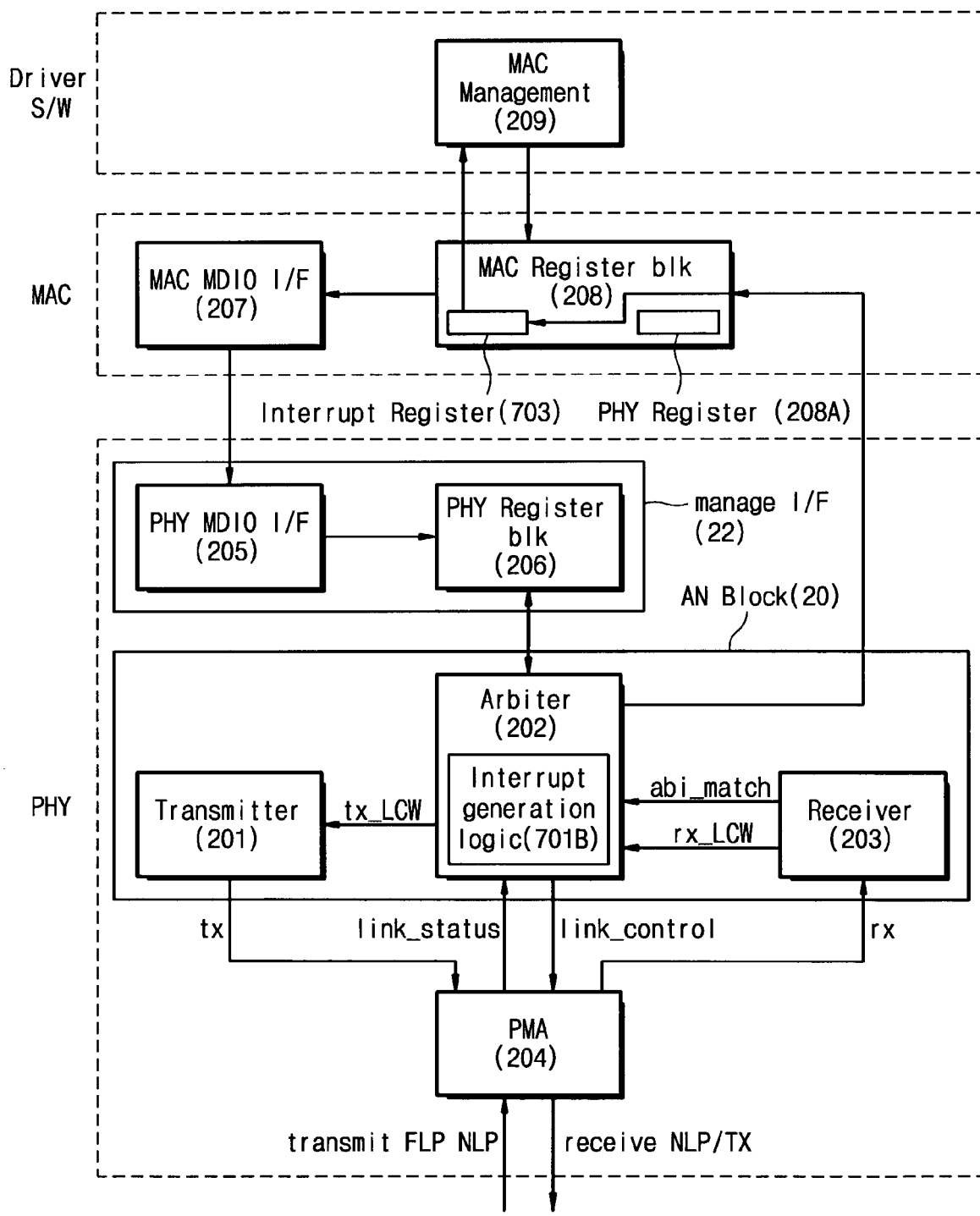
FIG. 7C is a diagram of layer architecture according to an embodiment of the present invention.

FIG. 7C depicts another embodiment of the layer architecture according to the present invention. Like FIGS. 7A and 7B, FIG. 7C depicts an interrupt register 703 not provided for by the Background Art FIG. 2. In contrast to FIGS. 7A and 7B, FIG. 7C provides for direct communication between the interrupt generation logic unit 701C, an integral part of the arbiter 202, and the interrupt register 703 in the MAC register block 208.

It is to be noted that the embodiment of FIG. 7A is advantageous in a circumstance in which the physical layer is embodied in an integrated circuit that is physically discreet from the integrated circuit in which the media access layer is embodied. The same advantage is enjoyed by FIG. 7B. As between FIGS. 7A and 7B, FIG. 7A is more advantageous for those integrated circuits that already have interrupt generation logic provided because it is expected that adapting the interrupt generation logic is less involved than adapting the arbiter 202. FIG. 7C is advantageous in the circumstance in which the physical layer and the media access layer are embodied by the same integrated circuit.

The operation of the various embodiments will now be described in terms of the flow chart of FIG. 9, which depicts an embodiment of steps to carry out the method according to the invention.

Figure 5:
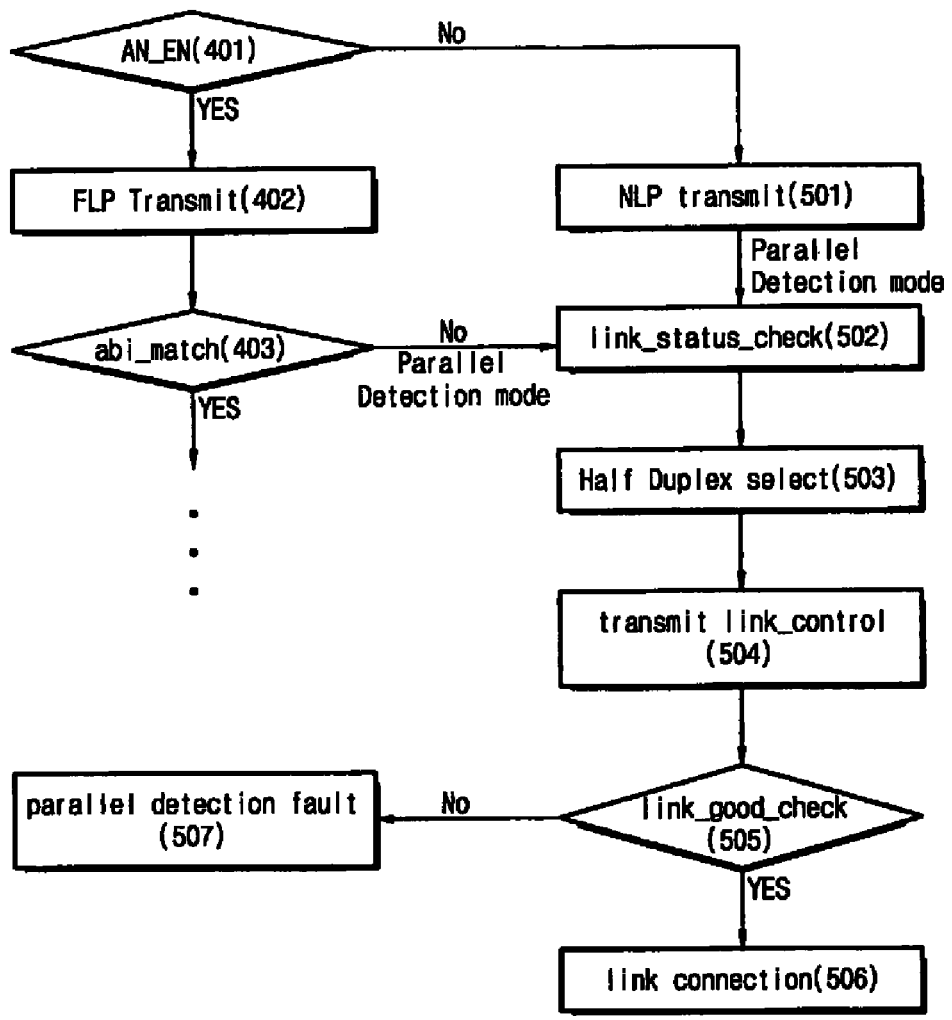
FIG. 5 is a more detailed flow chart of the AN function including the parallel detection according to the Background Art.
Figure 9:
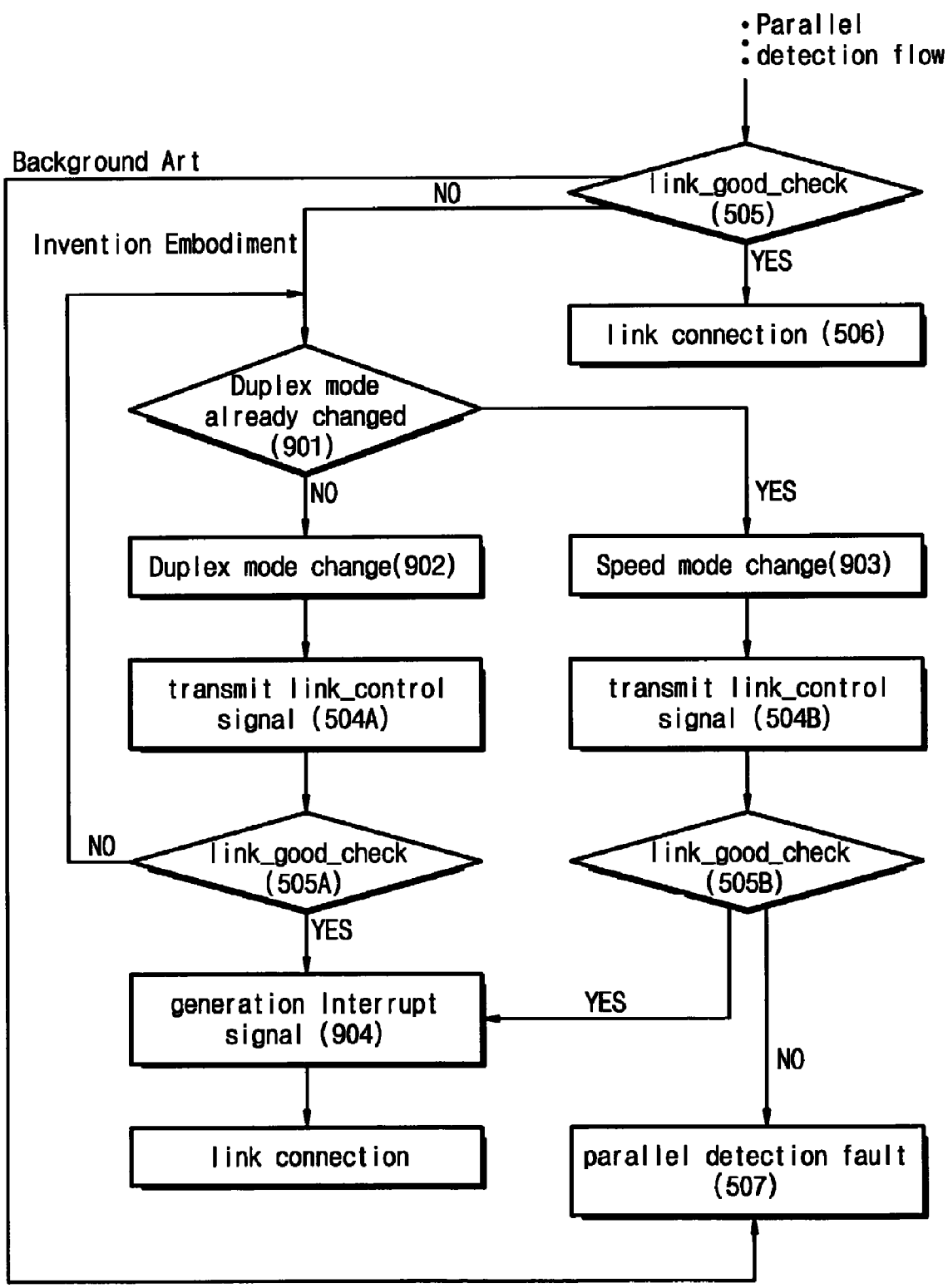
FIG. 9 is a flow chart showing overall procedure according to an embodiment of the present invention.

FIG. 9 shares a few steps in common with the Background Art flow chart of FIG. 5. Differences with respect to FIG. 5 will be discussed.

Flow proceeds to the decision step 505. There, if a comparison between bits B5-B8 of the ANAR 301 and the bits B5-B8 of the ANLPAR 302 by the arbiter 202 yields no match (again), then flow according to the Background Art would have proceeded to the parallel detection fault indication step 507. To account for the circumstance in which the manufacturer has chosen not to indicate half duplex capability in bits B5 and B7 of the ANAR register 301 because full duplex capability is present, embodiments of the present invention change the values in bits B5 and B7 of the ANAR register. This is accomplished as follows.

Flow proceeds from step 505 to decision step 901, where the arbiter 202 determines whether the duplex mode bits have been changed to indicate half duplex capability. If the arbiter 202 determines in step 901 that the duplex mode has not yet been changed, then flow proceeds to step 902, where the arbiter causes bits B5 and B7 of the ANAR register 301 to be set to a logic value 1 indicative of supporting half duplex mode.

Figure 10:
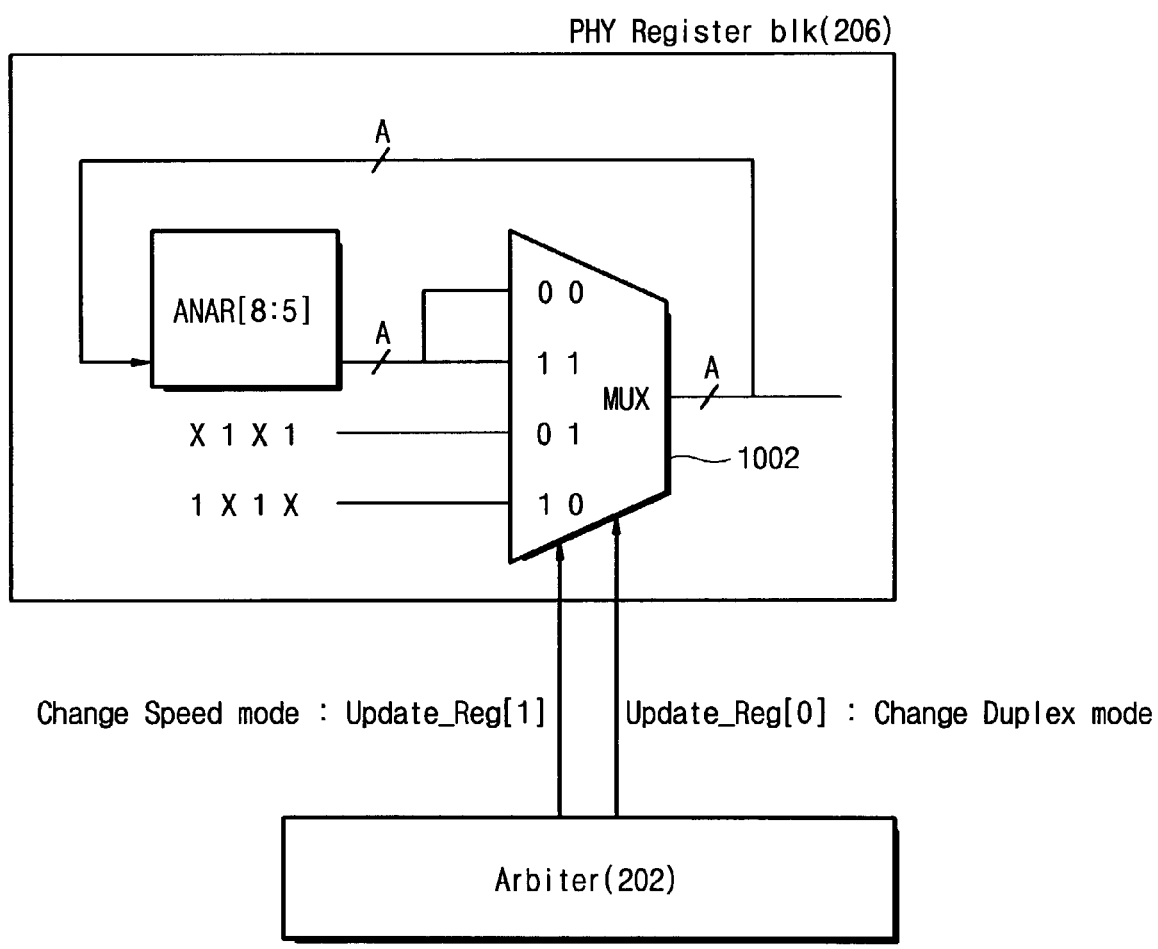
FIG. 10 is an example hardware arrangement according to an embodiment of the invention; and, FIG. 11 is an alternative pictorial summary of some aspects of the present invention.

FIG. 10 depicts an example embodiment of hardware to achieve the change in bits of step 902. In FIG. 10, a more detailed depiction of the PHY register block 208 and the arbiter 202 is presented. In particular, a PHY register block 208 is depicted as including a multiplexer unit 1002. The arbiter 202 passes parameter values Update_reg[0] and Update_reg[1] to the multiplexer (MUX) 1002. If the Update_reg[0] parameter is set to 1 while the Update_reg[1] parameter is set to 0, then the MUX causes bits B5 and B7 of the ANAR register to be set to logic value 1. If the Update_reg[0] parameter is set to logic value 0 while the Update_reg[1] parameter is set to logic value 1, then the MUX 1002 causes bit positions B6 and B8 of the ANAR 301 to be set to a logic state 1. And if the parameters Update_reg[0] and Update_reg[1] are both set to 0, or are both set to 1, then the MUX 1002 keeps bits B5-B8 of the ANAR 301 the same.

Continuing with FIG. 9, flow proceeds from step 902 to step 504A (which is similar to step 504 of FIG. 5), where the arbiter 202 causes signals indicative of half duplex capability to again be sent to the remote link partner. Flow proceeds to decision step 505A (again similar to step 505 of FIG. 5), where the arbiter 202 determines whether there is a match between newly-changed bits B5-B8 of the ANAR 301 and bits B5-B8 of the ANLPAR 302. If there is a match, then flow proceeds to step 904, where an interrupt signal is generated and ultimately provided to the interrupt register 703, which will be read by the MAC management unit 209. Flow proceeds from step 904 to step 506, where a link is established.

In FIG. 7A, the arbiter 202 causes the interrupt generation logic unit 701A to send an interrupt to interrupt logic unit 702A. The interrupt logic unit 702A changes the state of the interrupt register 703 to indicate that an interrupt has been received. FIG. 7B operates in essentially the same manner, differing only in that the interrupt generation logic unit 701B is integral with the arbiter 202. In FIG. 7C, the interrupt generation logic unit 701C write directly to the interrupt register 703, causing it to take a value indicative of having received an interrupt.

But if the arbiter 202 does not determine that a match exists in the decision step 505A, then flow proceeds back to decision step 901 where it is again determined whether the duplex mode has already been changed. In this pass through step 901, though, the duplex mode has already been changed, so flow proceeds to step 903, where the arbiter 202 changes the values of bits B6 and B8 in the ANAR 301. Again, this can be embodied via the hardware depicted in FIG. 10 in a circumstance in which the Update_reg[1] parameter equals logic-one. Flow proceeds from step 903 to step 504B (corresponding to step 504 of FIG. 5) and which is similar to step 504A. From step 504B, flow proceeds to the decision step 505B (corresponding to step 505 of FIG. 5) and similar to step 505A. If the arbiter 202 now determines there to be match between newly-changed (for a second time) bits B5-B8 of the ANAR 301 and bits B5-B8 of the ANLPAR 302, then flow proceeds to step 904. But if no match exists, then flow proceeds to step 507, where the indication of a parallel detection fault is provided.

Step 902 is provided for the situation in which the local link partner can support 10BASE full duplex operation, but the manufacturer of the local link partner device has not set bit B6 of the ANAR 301 equal to a logic-one because the faster 100BASE full duplex mode is also supported.

Step 903 is provided for the situation in which the local link partner can support 10BASE half duplex operation, but the manufacturer of the local link partner device has not set bit B5 of the ANAR 301 equal to a logic-one because the faster 100BASE half duplex mode is also supported.

Figure 11:
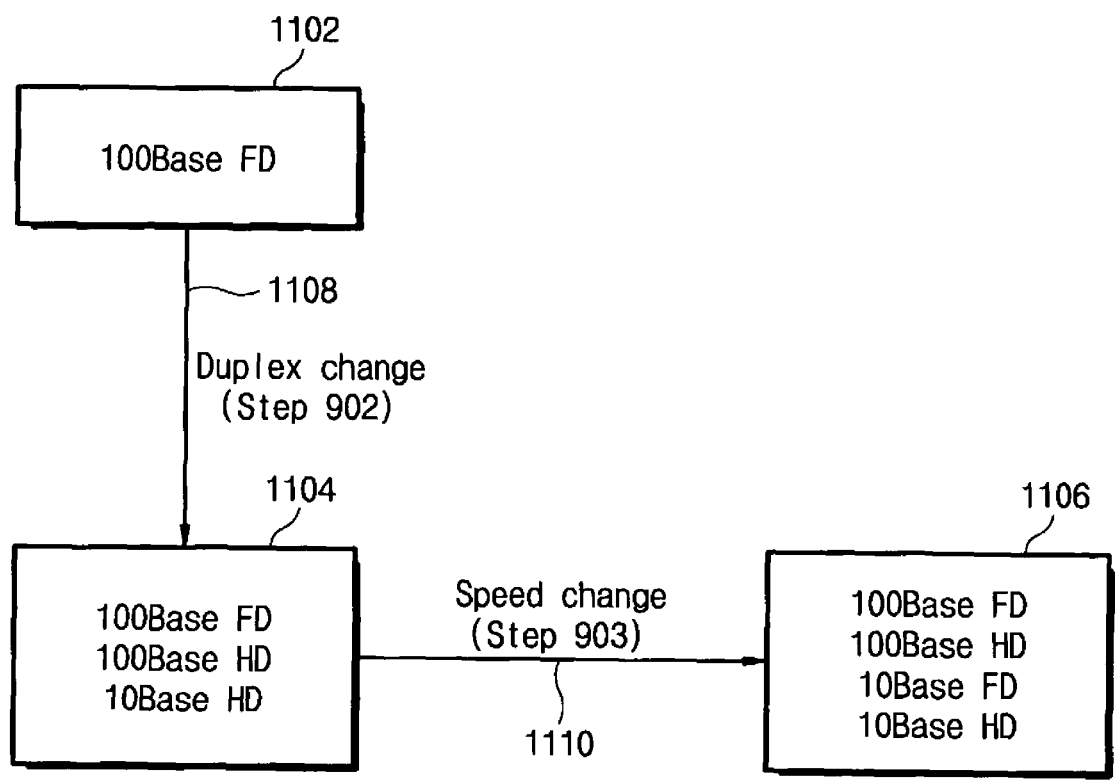

FIG. 11 is a pictorial summary of the method embodied by the flow chart of FIG. 9. In FIG. 11, box 1102 indicates a state in which the ANAR 301 indicates only that a 100BASE full duplex mode is supported. By way of step 902, a duplex state change is carried out (item 1108) so that the ANAR 301 additionally indicates support for 100BASE half duplex and 10BASE half duplex mode (item 1104). Also, a change of the indicated speed corresponding to step 903 (item 1110) takes place so that the ANAR 301 additionally indicates 10BASE full duplex mode capability (item 1106).

Figure 8A:
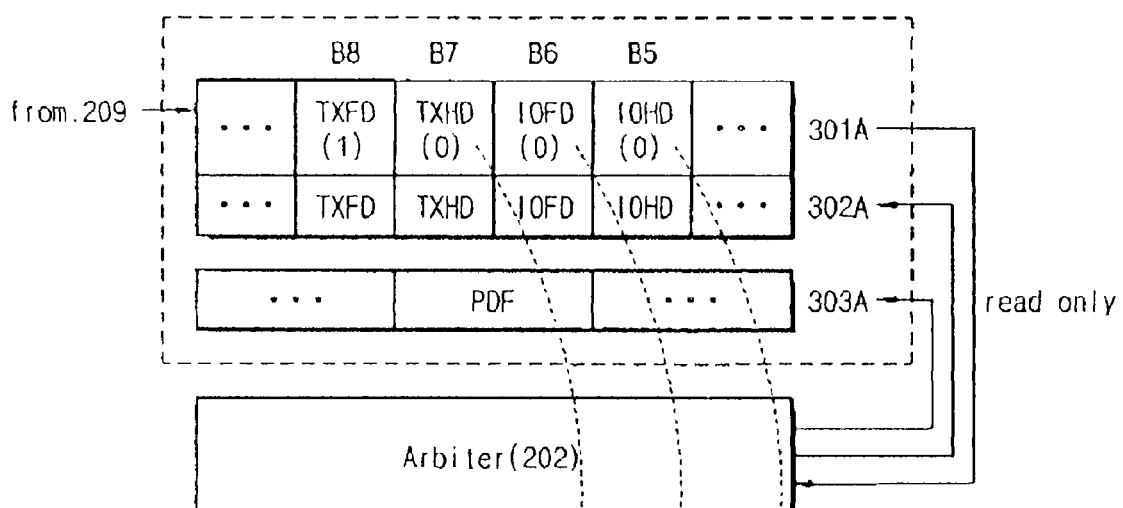
FIGS. 8A and 8B pictorially summarize some aspects of the present invention.
Figure 8B:
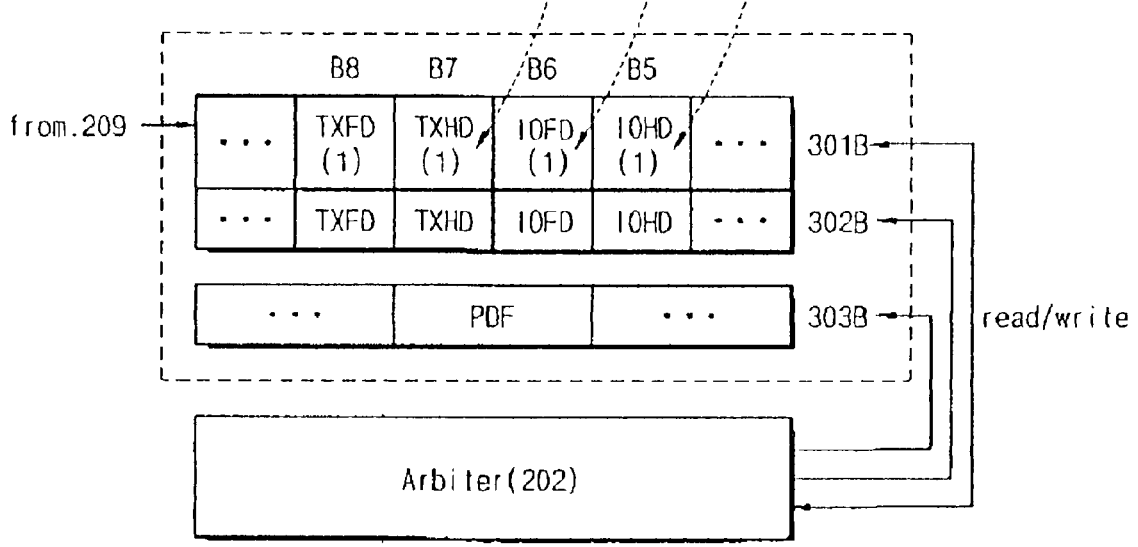

An alternative summary of the steps of FIG. 9 is depicted by way of FIGS. 8A and 8B. FIG. 8A corresponds to the Background Art circumstances in which a local link partner device can support 100 BASE half duplex mode and 10BASE half duplex mode as well as at least 100BASE full duplex mode and yet the manufacturer chooses to make bits B7 and B5, respectively, set at a logic value 0. In addition, the bit B6 is set to a logic value 0 despite the actual capability of the local link partner device to support 10BASE full duplex mode. Also, the interaction between the arbiter 202 and the ANAR 301A of FIG. 8A is a read-only type of interaction by the arbiter 202.

FIG. 8B shows that embodiments of the present invention change (see step 902) the indication of half duplex capability via action of the arbiter 202 as indicated by items 802 and 804 to be a logic-one state. This is made possible because the arbiter according to embodiments of the invention has a read/write interaction capability with the ANAR 301B. Also, the state of bit B6 is set (see step 903) to a logic-one to indicate 10BASE full duplex capability, as indicated by dashed line 806.

As an alternative, steps 902 and 903 could be combined to change all of bits B5-B8 to a logical one value at the same time.

Alternatively, changing a speed state (step 903) can be carried out before changing a duplex state (step 902).

The invention may be embodied in other forms without departing from its spirit and essential characteristics. The described embodiments are to be considered only non-limiting examples of the invention. The scope of the invention is to be measured by the appended claims. All changes which come within the meaning and equivalency of the claims are to be embraced within their scope.

What is claimed:

1. A method of parallel detection for a local link partner device having a local terminal advertisement register including a half duplex capability portion according to the Ethernet protocol, the method comprising:
   determining whether auto-negotiation is supported;
   selecting, if auto-negotiation is not supported by at least one participating terminal, half duplex mode; and
   updating the value of the half duplex capability portion included within the local terminal advertisement register to indicate half duplex mode.

2. The method of claim 1,
   wherein said steps of determining, selecting and updating take place in a physical layer, and
   wherein the method further comprises:
      indicating to a layer above said physical layer that the value in said half duplex capability portion has been updated.

3. The method of claim 2, wherein said step of indicating includes:
   providing a notice when said value in said half duplex capability portion has been updated; generating an interrupt signal in response to said notice; and
   providing said interrupt signal from said physical layer to said layer above said physical layer.

4. The method of claim 1,
   wherein said local terminal advertisement register further includes a speed capability portion, and
   wherein the method further comprises:
      determining whether a communications link with a remote device has been established; and
      updating, if no communications link is established, the value in said speed capability portion.

5. The method of claim 4,
   wherein said steps of determining and updating take place in a physical layer, and
   wherein the method further comprises:
      indicating to the layer above said physical layer that the value in said speed capability portion has been updated.

6. The method of claim 5, wherein said step of indicating includes:
   providing a notice when said value in said speed capability portion has been updated; generating an interrupt signal in response to said notice; and providing said interrupt signal from said physical layer to said layer above said physical layer.

7. The method of claim 4, wherein said step of updating the value in said speed capability portion updates by toggling the value in said speed capability portion.

8. The method of claim 4, wherein said speed capability portion is one or more bits within said local terminal advertisement register.

9. The method of claim 1, wherein said half duplex capability portion is one or more bits within said local terminal advertisement register.

10. The method of claim 1, wherein said step of updating the value of the half duplex capability portion updates by toggling the value of the half duplex capability portion.

11. The method of claim 1, wherein the step of selecting selects the half duplex mode even if the at least one participating terminal has full duplex mode capability.

12. For an Ethernet communication protocol in a circumstance in which Ethernet-type auto-negotiation is not supported by at least one participating terminal, a system of parallel detection comprising:
   a local terminal advertisement register including a half duplex capability portion;
   an arbiter for determining whether auto-negotiation is supported and for selecting half duplex mode where auto-negotiation is not supported,
      said arbiter further being operable to update the value of the half duplex capability portion included within the local terminal advertisement register to indicate half duplex mode.

13. The system of claim 12,
   wherein said local terminal advertisement register and said arbiter are in a physical layer, and
   wherein the system further comprises:
      interrupt generation logic for indicating to a layer above said physical layer that the value in said half duplex capability portion has been updated.

14. The system of claim 13, wherein said interrupt generation logic is operable to
   receive a notice from said arbiter when said value in said half duplex capability portion or said speed capability portion has been updated,
   generate an interrupt signal in response to said notice; and
   provide said interrupt signal from said physical layer to said layer above said physical layer.

15. The system of claim 13, wherein said interrupt generation logic is integrated within said arbiter.

16. The system of claim 13, wherein interrupt generation logic is a unit in said physical layer that is distinct from said arbiter.

17. The system of claim 12,
   wherein said local terminal advertisement register further includes a speed capability portion, and
   wherein said arbiter is further operable to
      determine whether a communications link with a remote device has been established; and
      update, if no communications link is established, the value in said speed capability portion.

18. The system of claim 17,
   wherein said local terminal advertisement register and said arbiter are in a physical layer, and wherein the system further comprises:
  interrupt generation logic for indicating to the layer above said physical layer that the values in said half duplex capability portion and said speed capability portion have been updated.

19. The system of claim 18, wherein said interrupt generation logic is operable to
  receive a notice from said arbiter when said value in said half duplex capability portion or said speed capability portion has been updated,
  generate an interrupt signal in response to said notice; and
  provide said interrupt signal from said physical layer to said layer above said physical layer.

20. The system of claim 18, wherein said interrupt generation logic is integrated within said arbiter.

21. The system of claim 18, wherein interrupt generation logic is a unit in said physical layer that is distinct from said arbiter.

22. The system of claim 17, wherein said arbiter updates said value in said speed capability portion by toggling.

23. The system of claim 17, wherein said speed capability portion is one or more bits within said local terminal advertisement register.

24. The system of claim 12,
  wherein said system is formed on a single integrated circuit,
  wherein said local terminal advertisement register and said arbiter are in a physical layer, and
  wherein the system further comprises:
    interrupt generation logic for indicating to a layer above said physical layer that the value in said half duplex capability portion has been updated.

25. The system of claim 24, wherein said interrupt generation logic is integrated within said arbiter.

26. The system of claim 24,
  wherein said layer above said physical layer includes a control register related to control of said physical layer, and
  wherein said interrupt generation logic is operable to update a corresponding portion of said control register.

27. The system of claim 12, wherein said half duplex capability portion is one or more bits within said local terminal advertisement register.

28. The system of claim 12, wherein said arbiter updates said value in said half duplex capability portion by toggling.

29. The system of claim 12, wherein the arbiter further is operable to select the half duplex mode even if locally there is full duplex mode capability.

30. An Ethernet communication protocol-capable system comprising:
  a physical medium input/output unit to interface with a remote Ethernet-communication-protocol-capable system;
  a receiver unit to receive signals from said remote system via said input/output unit;
  a transmitter to send signals to said remote unit via said input/output unit;
  a local terminal advertisement register including a half duplex capability portion; and
  an arbiter to determine, via said receiver and said transmitter, whether a communication link with said remote system has been established;
  wherein said arbiter is operable to
    determine whether auto-negotiation is supported by said remote system, and
    adopt a parallel detection mode in which said arbiter is operable to
      select half duplex mode where auto-negotiation is not supported by said remote system, and
      update the value of the half duplex capability portion included within the local terminal advertisement register to indicate half duplex mode.

31. The system of claim 30,
  wherein said local terminal advertisement register, said arbiter, said receiver, said transmitter and said input/output unit are in a physical layer, and
  wherein the system further comprises:
    interrupt generation logic for indicating to a layer above said physical layer that the value in said half duplex capability portion has been updated.

32. The system of claim 31,
  wherein said layer above said physical layer includes
    a control register related to control of said physical layer, and
    interrupt receipt logic;
  wherein said interrupt generation logic is operable to
    receive a notice from said arbiter when said value in said half duplex capability portion or said speed capability portion has been updated,
    generate an interrupt signal in response to said notice; and
    provide said interrupt signal to said interrupt receipt logic; and
  wherein said interrupt receipt logic is operable to update a corresponding portion of said control register.

33. The system of claim 31, wherein said interrupt generation logic is integrated within said arbiter.

34. The system of claim 31, wherein interrupt generation logic is a unit in said physical layer that is distinct from said arbiter.

35. The system of claim 31,
  wherein said system is formed on a single integrated circuit;
  wherein said layer above said physical layer includes
    a control register related to control of said physical layer;
  wherein said interrupt generation logic is operable to
    receive a notice from said arbiter when said value in said half duplex capability portion has been updated,
    generate an interrupt signal in response to said notice; and
    provide said interrupt signal to said control register so as to update a corresponding portion of said control register.

36. The system of claim 30,
  wherein said local terminal advertisement register further includes a speed capability portion, and
  wherein said arbiter is further operable to
    compare information received from said remote system with contents of said local terminal advertisement register to determine whether a communications link with said remote system has been established; and
    update, if no communications link is established, the value in said speed capability portion.

37. The system of claim 36, wherein
  said local terminal advertisement register, said arbiter, said receiver, said transmitter and said input/output unit are in a physical layer, and
  wherein the system further comprises:
    interrupt generation logic for indicating to a layer above said physical layer that the values in said half duplex capability portion and said speed capability portion have been updated.

38. The system of claim 37,
wherein said layer above said physical layer includes
a control register related to control of said physical layer, and
interrupt receipt logic;
wherein said interrupt generation logic is operable to
receive a notice from said arbiter when said value in said half duplex capability portion or said speed capability portion has been updated,
generate an interrupt signal in response to said notice; and
provide said interrupt signal to said interrupt receipt logic; and wherein said interrupt receipt logic is operable to update a corresponding portion of said control register.

39. The system of claim 37, wherein said interrupt generation logic is integrated within said arbiter.

40. The system of claim 37, wherein interrupt generation logic is a unit in said physical layer that is distinct from said arbiter.

41. The system of claim 36, wherein said arbiter updates said value in said speed capability portion by toggling.

42. The system of claim 36, wherein said speed capability portion is one or more bits within said local terminal advertisement register.

43. The system of claim 30, wherein said half duplex capability portion is one or more bits within said local terminal advertisement register.

44. The system of claim 30, wherein said arbiter updates said value in said half duplex capability portion by toggling.

45. The system of claim 30, wherein the arbiter further is operable to select the half duplex mode even if locally there is full duplex mode capability.

* * * * *